T. H. DOLLING.
BEET HARVESTER.
APPLICATION FILED DEC. 23, 1919.
1,388,991.
Patented Aug. 30, 1921.
3 SHEETS—SHEET 1.
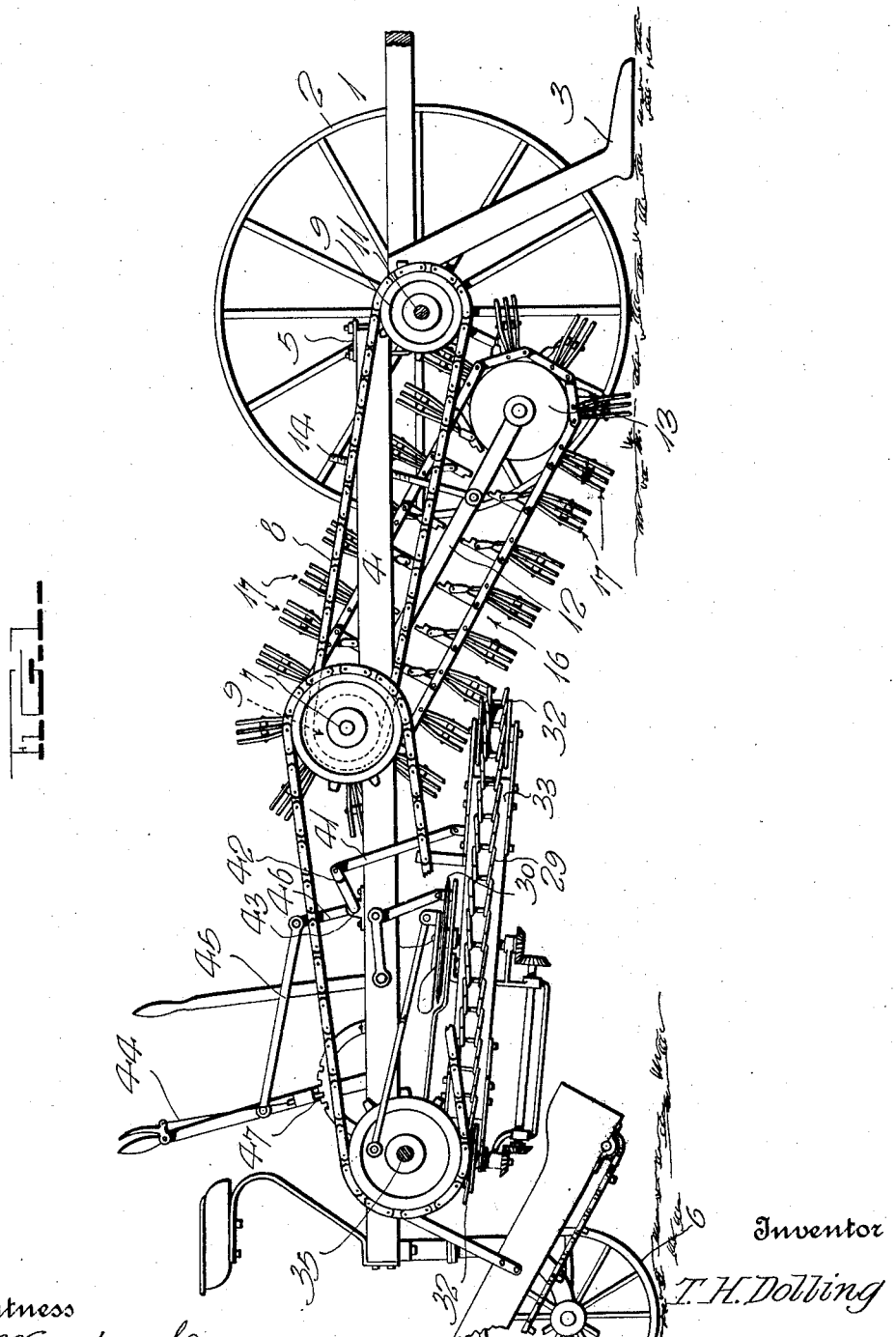
Witness
H. Woodard
Inventor
T. H. Dolling
By 
Attorneys

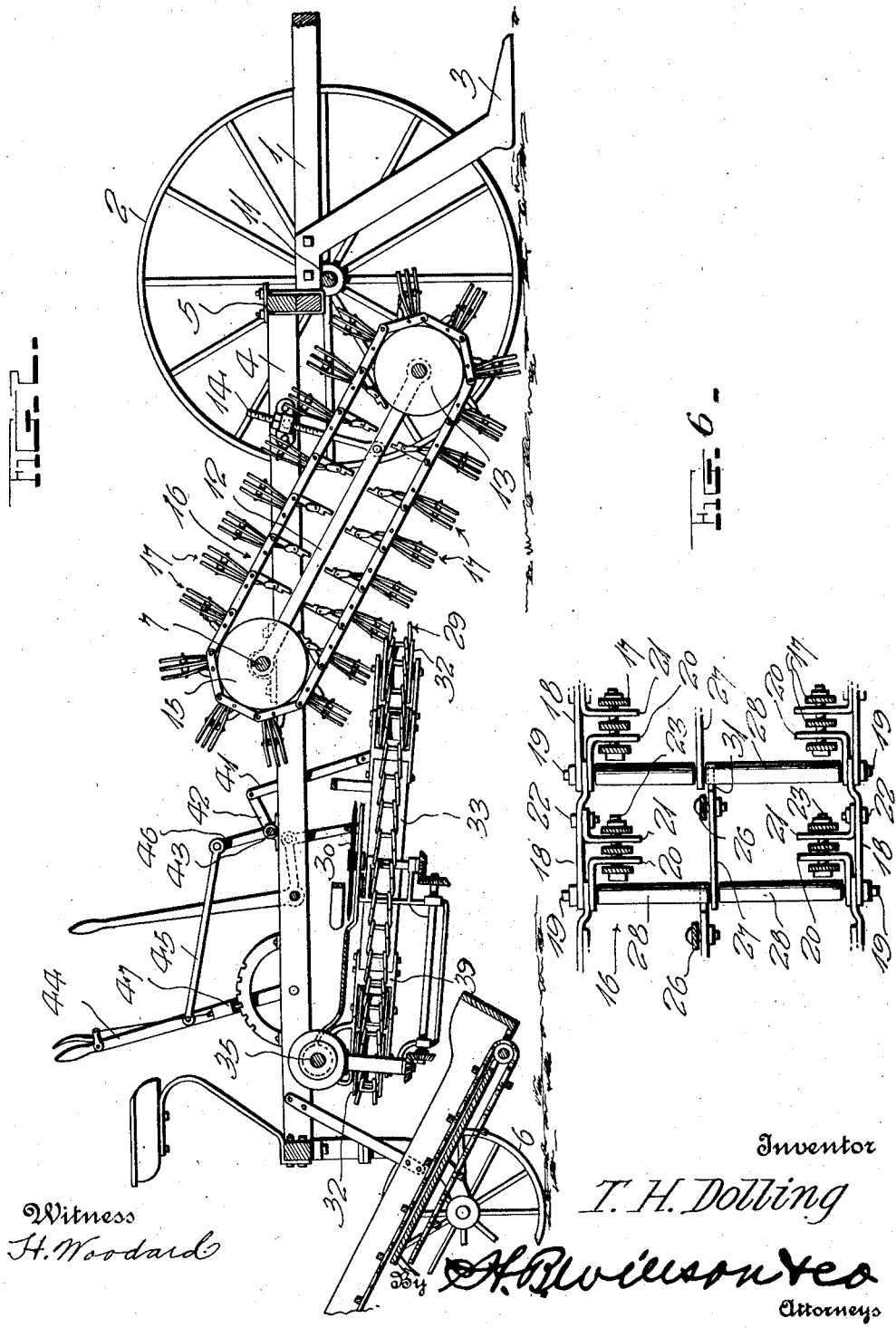

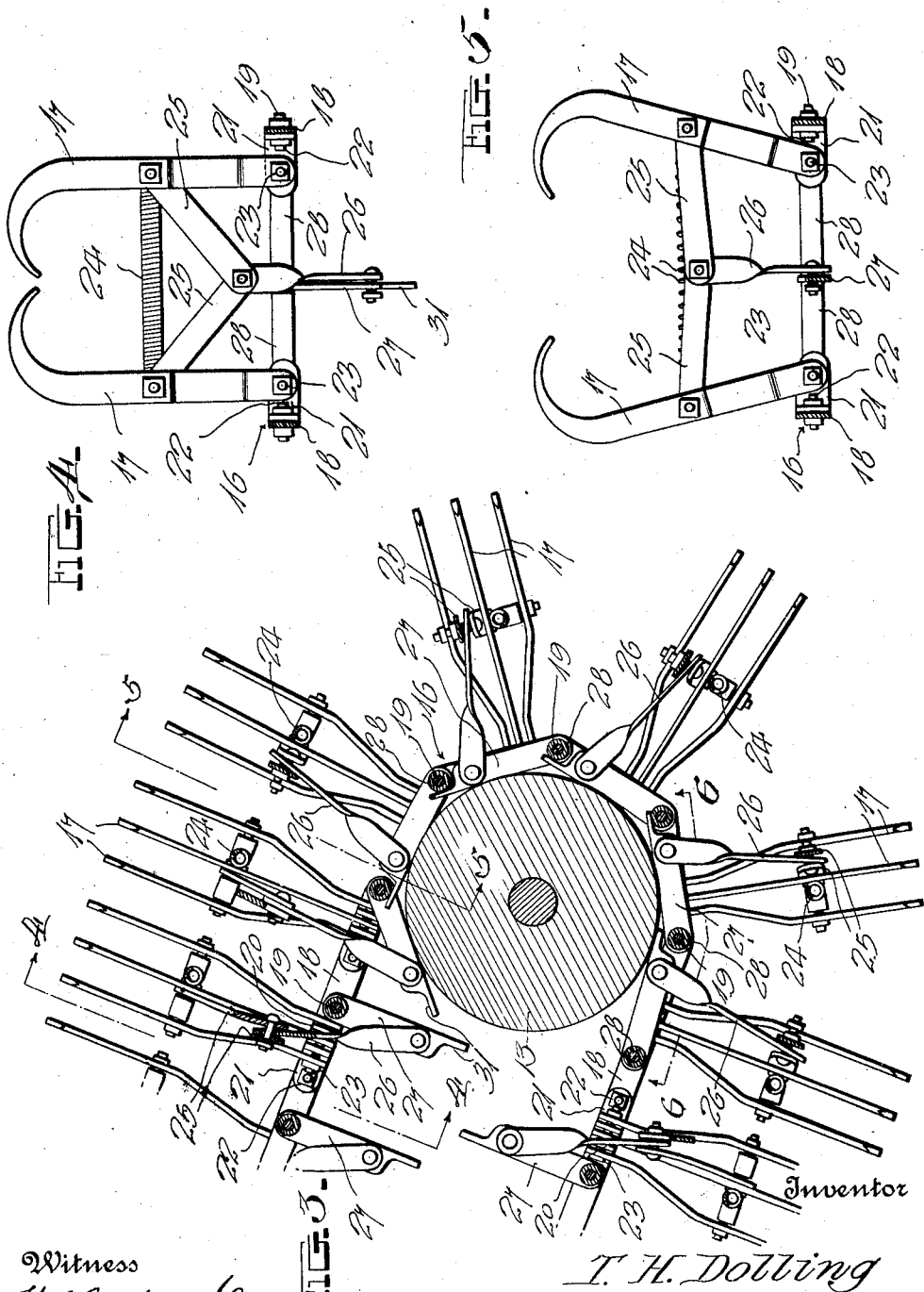

UNITED STATES PATENT OFFICE.

THOMAS H. DOLLING, OF LA JUNTA, COLORADO.

BEET-HARVESTER.

1,388,991.   Specification of Letters Patent.   Patented Aug. 30, 1921.

Application filed December 23, 1919. Serial No. 346,882.

*To all whom it may concern:*

Be it known that I, THOMAS H. DOLLING, a citizen of the United States, residing at La Junta, in the county of Otero and State of Colorado, have invented certain new and useful Improvements in Beet-Harvesters; and I do declare the following to be a full, clear, and exact description of the invention, such as will enable others skilled in the art to which it appertains to make and use the same.

My invention relates to beet harvesting machines in general and the present disclosure is directed more particularly to an attachment for beet diggers of well known construction.

One object of the invention is to provide an extremely simple and inexpensive, yet a highly efficient and reliable means for gripping the beets as they are loosened by a digger, and carrying them rearwardly to topping mechanism, this carrying and gripping means consisting of an endless driven chain of novel form upon which opposed beet grippers are mounted, together with wheels around which the chain is trained, and means on the chain to strike the wheels and open the beet grippers against the tension of springs which normally close them.

With the foregoing in view, the invention resides in the novel construction and arrangement of parts hereinafter described and claimed, the descriptive matter being supplemented by the accompanying drawings.

Figure 1 is a side elevation partly in section.

Fig. 2 is substantially a central vertical longitudinal section.

Fig. 3 is a substantially central section through the front end of the beet gripping and conveying means.

Figs. 4 and 5 are detail vertical sections on the planes of the lines 4—4 and 5—5 of Fig. 3.

Fig. 6 is a plan view of part of the endless chain upon which the beet grippers are mounted, showing said grippers and parts of their operating means in section on the plane of line 6—6 of Fig. 3.

In the drawings above briefly described I have shown my invention attached to a common form of beet digger which consists of a frame 1 having supporting wheels 2 and carrying beet digging plows 3.

The frame 4 of my attachment is shown connected at its front end with the frame 1 by clips 5 although any other suitable means could be employed for establishing this connection. Similarly I have shown caster wheels 6 for supporting the rear end of frame 4, but other adequate means could be utilized to equal advantage.

Spaced a suitable distance behind the front end of the frame 4, is a transverse shaft 7 mounted in suitable bearings carried by said frame, said shaft being driven by a sprocket chain 8, and sprockets 9 from the axle 11 of the wheels 2, or other adequate driving means may be employed for said shaft. Suitable bars 12 are pivotally mounted at their rear ends on the shaft 7 and carry a wheel 13 at their front ends, and these bars may be raised and lowered as desired by an adjustable hanger 14. Another wheel 15 is secured on the shaft 7 behind the wheel 13, and an endless chain 16 is trained around the two wheels, said chain carrying opposed beet grippers 17. The specific construction of the chain, the grippers and the operating means for the latter, is shown most clearly in Figs. 3 to 6, to which attention is directed more particularly in the following. It will be understood however that the specific details described need not be followed too closely, but that other structures may be used within the scope of the invention as claimed.

Chain 16 consists of two linked side members 18 connected by tie rods 19, and each side member carries a plurality of L-shaped brackets 20 and 21. The alternate brackets 20 are mounted on the ends of the rods 19 while the intervening brackets 21 are secured by bolts or the like 22 to the links of the side members 18. The inwardly extending arms of the brackets carry longitudinal bolts 23 upon which the inner ends of the grippers 17 are pivotally mounted, said grippers preferably consisting of a plurality of hooks as shown, and coil springs 24 connecting said hooks for closing them around the beets.

The opposed hooks are connected by toggle links 25, and actuating links 26 are pivoted to said toggle links at one end while their other ends are pivotally attached to operating levers 27 which are fulcrumed on the tie rods 19. Spacing sleeves 28 may well surround these rods between the levers 27 and the brackets 20 in order to hold the former properly centered. The action of the springs 24 normally moves the grippers 17 inwardly to the positon disclosed in Fig. 4 and the operating levers 27 extend inwardly from the chain 16 as seen in Fig. 3. As this chain travels around the lower wheel 13, the levers in question strike said wheel and are thus swung upwardly between the side members 18, thereby moving the toggle links 25 into approximate alinement as shown in Fig. 5, and opening the grippers 17. In this open position, the grippers straddle the beets loosened by the plows 3 and when the levers 27 leave roller 13, the springs 24 again close said grippers around the beets so that the latter are carried upwardly and rearwardly to endless belt conveyers 29 which carry them to a pair of rotary topping cutters 30.

In order to prevent outward movement of the links 25 sufficiently to position them on dead center, the free ends of the levers 27 are preferably provided with stops 31 adapted to strike the tie rods 19 or the spacing sleeves 28 as shown clearly in Fig. 3.

The endless belt conveyers 29 are trained around front and rear wheels 32 mounted on the ends of a pair of longitudinal beams 33 whose rear ends are hung by suitable bearings 34 upon a transverse shaft 35. The front ends of the beams 33 are connected by vertical links 41 with crank arms 42 on a rock shaft 43 mounted transversely on the frame 4, and by means of a lever 44, link 45 and crank arm 46, said shaft 43 may be rocked at will to properly adjust the belts 29 with respect to the grippers 17 for beets of various sizes, so that as said grippers release the beets, they will be effectively gripped between the belts 29 and carried rearwardly to the topping cutters 30. By means of a pawl and ratchet mechanism 47, the lever 44 may be locked against movement after proper adjustment of the belts 29.

The attachment may be adapted to numerous forms of digging machines and adjusted to meet requirements. The conveying and gripping means 16—17 may be properly set by the adjustable hangers 14 so that the grippers will engage the beets loosened by the plows 3, said grippers carrying the beets rearwardly until their release levers 27 strike the rear wheel 15. When this takes place, the opposed grippers are spread and when this occurs the endless belt conveyers 29 receive the beets therebetween and convey them rearwardly to the cutters 30. Whenever necessary, the lever 44 is moved to properly set the belts 29 with respect to the grippers 17.

The machine is of comparatively simple and inexpensive nature and is highly efficient and desirable in every way, and since probably the best results may be obtained from the details shown, they may well be followed. I wish it understood however that within the scope of the invention as claimed, numerous changes may be made as occasion may dictate. For instance, any adequate driving means may be used for the several moving parts and I am not therefore restricted to the arrangement shown.

I claim:

1. In a machine of the class described, an endless driven chain, wheels around which said chain is trained, opposed spring-closed beet grippers mounted on said chain, toggle links connecting the opposed grippers, actuating links connected at one end with said toggle links, and operating levers fulcrumed on said chain for swinging longitudinally thereof, said levers being connected with said actuating links and normally extending inwardly from the chain to strike one of said wheels, whereby to actuate said links to spread said grippers.

2. In a machine of the class described, an endless chain consisting of linked side members and spacing rods extending between them, wheels around which said chain is trained, spring-closed beet grippers pivoted on said side members for swinging transversely of said chain, toggle links connecting said grippers, actuating links connected to said toggle links, and operating levers fulcrumed on said spacing rods and connected with said actuating links, said levers normally extending inwardly from the chain to strike and be actuated by one of said wheels, whereby to spread the grippers.

3. A structure as specified in claim 2, each lever having a portion to strike the next adjacent spacing rod and limit the outward movement of such lever.

4. In a machine of the class described, an endless chain consisting of linked side members and spacing rods extending between them, L-shaped brackets spaced along said side members, alternate brackets being mounted on the ends of said tie rods while the intervening brackets are secured to the links of the chain, bolts extending longitudinally of the chain and carried by said brackets, beet grippers mounted on said bolts, and means for operating said grippers.

In testimony whereof I have hereunto set my hand.

THOMAS H. DOLLING.